United States Patent
Zou et al.

(10) Patent No.: US 10,560,346 B2
(45) Date of Patent: Feb. 11, 2020

(54) SERVICE IMPLEMENTATION METHOD AND APPARATUS

(71) Applicant: ALIBABA GROUP HOLDING LIMITED, Grand Cayman (KY)

(72) Inventors: Ran Zou, Hangzhou (CN); Shuai Zheng, Hangzhou (CN); Guqiang Lin, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 206 days.

(21) Appl. No.: 15/813,378

(22) Filed: Nov. 15, 2017

(65) Prior Publication Data

US 2018/0069769 A1 Mar. 8, 2018

Related U.S. Application Data

(63) Continuation of application No. PCT/CN2016/082164, filed on May 16, 2016.

(30) Foreign Application Priority Data

May 22, 2015 (CN) .......................... 2015 1 0268578

(51) Int. Cl.
  *H04L 12/24* (2006.01)
  *G06Q 10/06* (2012.01)
(52) U.S. Cl.
  CPC ....... *H04L 41/5048* (2013.01); *G06Q 10/063* (2013.01); *G06Q 10/06316* (2013.01); *H04L 41/0843* (2013.01)
(58) Field of Classification Search
  CPC ............ H04L 41/5048; H04L 41/0843; G06Q 10/063; G06Q 10/06316; G06Q 10/00
  (Continued)

(56) References Cited

U.S. PATENT DOCUMENTS 8,769,101 B2  7/2014 Xu et al.
2002/0061741 A1  5/2002 Leung et al.
(Continued)

FOREIGN PATENT DOCUMENTS

CN  101763599 A  6/2010
CN  102024235 A  4/2011
(Continued)

OTHER PUBLICATIONS

International Preliminary Report on Patentability for Application No. PCT/CN2016/082164, dated Nov. 28, 2017, 12 pages.
(Continued)

*Primary Examiner* — Tu T Nguyen

(57) ABSTRACT

This application provides a service implementation method and apparatus. The method may include: returning, when an object creation request from an object provider is received, a response message to the object provider according to an application scenario corresponding to the object creation request, the response message including at least one flow template matching the application scenario; selecting, according to a selection instruction sent by the object provider, a flow template for a target object corresponding to the object creation request; and implementing, when an interaction request for the target object is received from a data provider, an interactive operation between the object provider and the data provider according to the selected flow template. By means of the technical solutions of this application, configuration and template customization can be performed on a service flow, and a more flexible interactive operation can be implemented.

20 Claims, 6 Drawing Sheets

(58) Field of Classification Search
USPC .......................................................... 709/223
See application file for complete search history.

(56) References Cited

U.S. PATENT DOCUMENTS

| | | | |
|---|---|---|---|
| 2003/0144860 A1 | 7/2003 | Casati et al. | |
| 2004/0157625 A1 | 8/2004 | Gheorghiu et al. | |
| 2005/0004825 A1 | 1/2005 | Ehrler et al. | |
| 2005/0044007 A1* | 2/2005 | Shitomi | G06F 9/445 |
| | | | 705/26.1 |
| 2005/0096960 A1 | 5/2005 | Plutowski et al. | |
| 2006/0095576 A1 | 5/2006 | Perry et al. | |
| 2007/0011281 A1 | 1/2007 | Jhoney et al. | |
| 2007/0209011 A1 | 9/2007 | Padmanabhuni et al. | |
| 2007/0300224 A1 | 12/2007 | Aggarwal et al. | |
| 2008/0028317 A1 | 1/2008 | Castelli et al. | |
| 2008/0071597 A1 | 3/2008 | Chafle et al. | |
| 2009/0164996 A1 | 6/2009 | Baeuerle et al. | |
| 2009/0299513 A1 | 12/2009 | Suh et al. | |
| 2011/0258138 A1* | 10/2011 | Kulkarni | G06Q 10/067 |
| | | | 705/348 |
| 2011/0282707 A1 | 11/2011 | Rangaswamy et al. | |
| 2013/0263143 A1 | 10/2013 | Kiyoumi | |
| 2015/0095097 A1 | 4/2015 | Dejardine et al. | |
| 2016/0147828 A1* | 5/2016 | Yu | G06Q 40/123 |
| | | | 705/31 |

FOREIGN PATENT DOCUMENTS

| | | |
|---|---|---|
| CN | 102137135 A | 7/2011 |
| CN | 102542414 A | 7/2012 |
| CN | 104021448 A | 9/2014 |
| JP | 2013-210756 A | 10/2013 |

OTHER PUBLICATIONS

First Office Action and Search for Chinese Patent Application No. 201510268578.X dated Dec. 6, 2018, 8 pages.
Second Office Action for Chinese Patent Application No. 201510268578.X dated May 22, 2019, 7 pages.
International Search Report and Written Opinion for Application No. PCT/CN2016/082164, dated Jul. 27, 2016, 9 pages.
First Office Action for Japanese Application No. 2017-560738 dated Dec. 3, 2019 (9 pages).

* cited by examiner

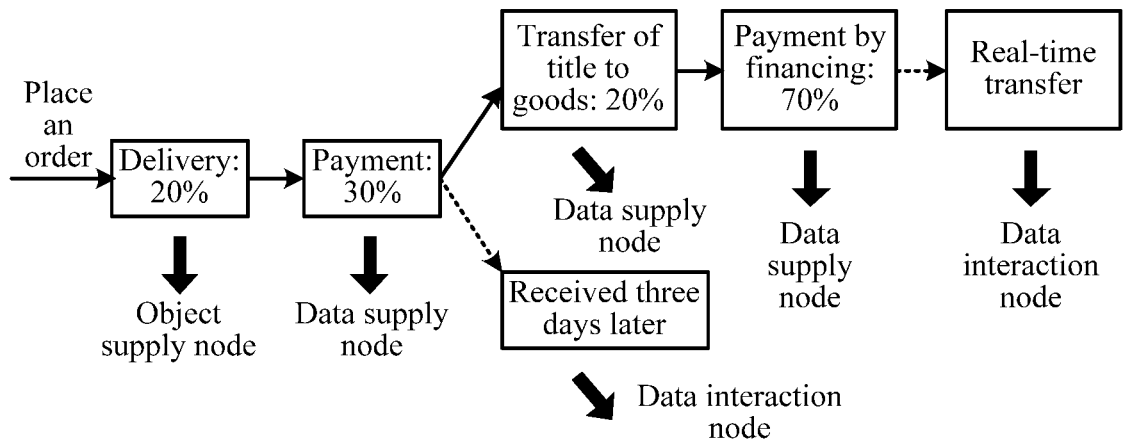

FIG. 3

| Stage 1 | | | | | |
|---|---|---|---|---|---|
| Delivery | | | | | Delete |
| Delivery ratio ☐ % | | Receipt confirmation timeout | ☐ Day ☐ Hour ☐ Minute | | |
| Payment | | | | Set as a start point | Delete |
| Payment ratio ☐ % | | Payment timeout | ☐ Day ☐ Hour ☐ Minute | | |
| Settlement | | | | | |
| Settlement method | ○ Single ○ Multiple | Times of settlement | ☐ Times | | |
| Settlement time | ○ After delivery | Settlement ratio | of payment in stage 1 ☐ % | | |
| | ○ After receipt confirmation | | | | |
| | ○ After payment ☐ Day ☐ Hour ☐ Minute | | | | |

FIG. 4A

| Stage 1 | |
|---|---|

Delivery                           [Delete]

Delivery ratio [20]%    Receipt confirmation timeout [7] Day [0] Hour [0] Minute Payment                      [Set as a start point] [Delete]

Payment ratio [30]%    Payment timeout [7] Day [0] Hour [0] Minute

Settlement
    Settlement method ○ Single ● Multiple    Times of settlement [2] Times
    Settlement time ○ After delivery    Settlement ratio of payment in stage 1 [100]%
                   ○ After receipt confirmation
                   ● After payment [3] Day [0] Hour [0] Minute

FIG. 4B

Stage 1

Payment [Delete]

Payment ratio [ ] %    Payment timeout [ ] Day [ ] Hour [ ] Minute

Delivery [Set as a start point] [Delete]

Allow tolerance before delivery ○ Yes ○ No

Delivery ratio [ ] %    Receipt confirmation timeout [ ] Day [ ] Hour [ ] Minute Settlement Settlement method ○ Single ○ Multiple    Times of settlement [ ] Times Settlement time ○ After delivery    Settlement ratio of payment in stage 1 [ ] %

○ After receipt confirmation

○ After payment [ ] Day [ ] Hour [ ] Minute

FIG. 4C

SERVICE IMPLEMENTATION METHOD AND APPARATUS

CROSS-REFERENCE TO RELATED APPLICATIONS

The present application is a continuation application of International Patent Application No. PCT/CN2016/082164, filed May 16, 2016, which is based on and claims priority to Chinese Patent Application No. 201510268578.X, filed on May 22, 2015 and entitled "Service Implementation Method and Apparatus." The above referenced applications are incorporated herein by reference in their entirety.

TECHNICAL FIELD

This application relates to the field of Internet technologies, and in particular, to a service implementation method and apparatus.

RELATED ART

In related technologies, users are provided with interactive platforms and users may perform object and data interaction on an interactive platform. When an interactive operation is to be performed between users, a specific service flow needs to be followed, and different users usually have different service flow execution requirements in different situations.

SUMMARY

In view of this, this application provides a service implementation method and apparatus, so as to perform configuration and template customization on a service flow, and implement a more flexible interactive operation.

To achieve the foregoing objective, this application provides the following technical solutions. A first aspect of this application provides a service implementation method, including:

returning, when an object creation request from an object provider is received, a response message to the object provider according to an application scenario corresponding to the object creation request, the response message including at least one flow template matching the application scenario;

selecting, according to a selection instruction sent by the object provider, a flow template for a target object corresponding to the object creation request; and implementing, when an interaction request for the target object is received from a data provider, an interactive operation between the object provider and the data provider according to the selected flow template.

A second aspect of this application provides a service implementation apparatus, including:

a response unit, for returning, when an object creation request from an object provider is received, a response message to the object provider according to an application scenario corresponding to the object creation request, the response message including at least one flow template matching the application scenario;

a selection unit, for selecting, according to a selection instruction sent by the object provider, a flow template for a target object corresponding to the object creation request; and an execution unit, for implementing, when an interaction request for the target object is received from a data provider, an interactive operation between the object provider and the data provider according to the selected flow template.

A further aspect of this application provides a service implementation apparatus, comprising a processor and a non-transitory computer-readable memory storing instructions that, when executed by the processor, cause the apparatus to perform a method. The method comprises:

returning, when an object creation request from an object provider is received, a response message to the object provider according to an application scenario corresponding to the object creation request, the response message comprising at least one flow template matching the application scenario;

selecting, according to a selection instruction sent by the object provider, a flow template for a target object corresponding to the object creation request; and implementing, when an interaction request for the target object is received from a data provider, an interactive operation between the object provider and the data provider according to the selected flow template.

It can be learned from the foregoing technical solutions that in this application, a service flow is customized flexibly by configuring a flow template, without being bound to a fixed flow model. This helps reduce costs and complexity of changing a service flow and improve versatility of the service flow. The disclosed technical solutions use specific rules to generate and configure transaction flow templates. This allows computers to simplify transaction steps/flows, and thus improves computer functionalities.

BRIEF DESCRIPTION OF THE DRAWINGS

FIG. 3 is a schematic diagram of a flow template according to an exemplary embodiment of this application;

FIG. 4A to FIG. 4C are schematic interface diagrams of a flow template according to an exemplary embodiment of this application;

DETAILED DESCRIPTION

In the related technologies, an interactive platform normally has a fixed service flow, and a user cannot change the service flow according to an actual application scenario, causing many compromises and dissatisfactions in an interaction process. Flexible configuration of the service flow is not taken into account when the interactive platform is designed. As a result, if the service flow needs to be changed or configured, the interactive platform needs to be redesigned.

This application resolves the foregoing technical problems in the related technologies by using a new service implementation process, to perform configuration and template customization on a service flow, and implement a more flexible interactive operation. The term service in this application should be construed broadly to include business transactions, such as transactions conducted electronically on the Internet.

Figure 1:
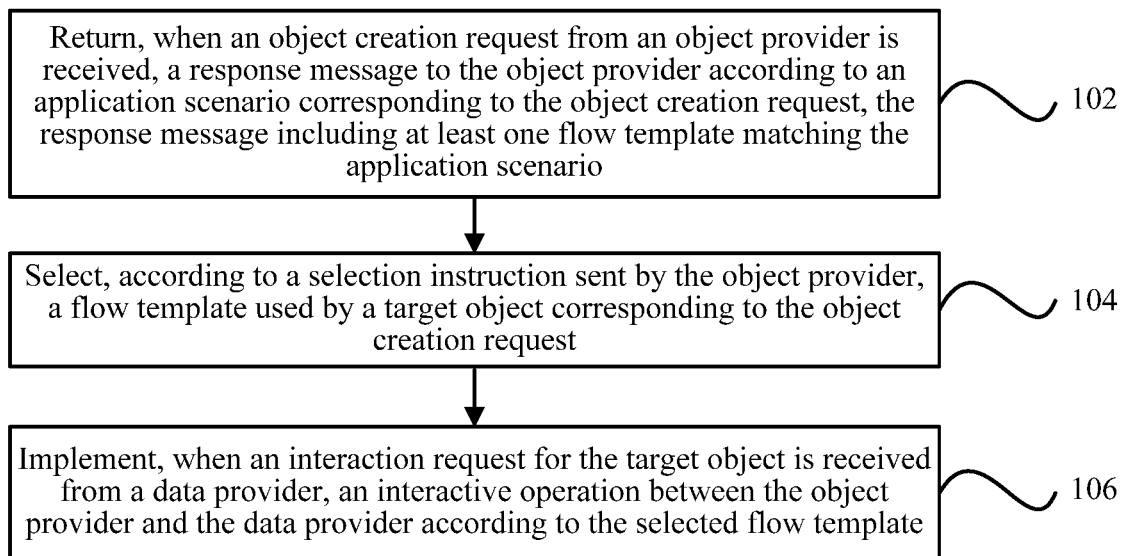
FIG. 1 is a flowchart of a service implementation method according to an exemplary embodiment of this application.

FIG. 1 is a flowchart of a service implementation method according to an exemplary embodiment of this application. As shown in FIG. 1, the method is implemented on a server. The server hosts an interactive platform configured to implement functions such as object interaction and data interaction. The method may include the following steps:

Step 102: Return, when an object creation request from an object provider is received, a response message to the object provider according to an application scenario corresponding to the object creation request, the response message including at least one flow template matching the application scenario.

In this embodiment, the flow template may include node variables respectively corresponding to multiple flow nodes that are arranged in a preset order. The node variable is selected from a node variable set corresponding to the corresponding flow node according to a preset rule. In this embodiment, the flow template may be configured according to a requirement by combining the flow nodes and selecting the node variables, so that the flow template satisfies an actual requirement of a user (for example, the object provider or a data provider) in a current application scenario.

In this embodiment, the interactive platform may have multiple application forms. For example, for an application form of a "network transaction", a "service flow" is a transaction flow, the "flow template" is an "execution template of the transaction flow", the "object provider" is a seller, and the "data provider" is a buyer, thereby configuring the transaction flow satisfying actual requirements of both the seller and the buyer. In addition, each application form may correspond to a plurality of application scenarios. For example, in a "network transaction", different types of transaction commodities may correspond to different application scenarios. For example, home appliances and building materials are different in occupation space, a transmission mode, a payment method, a settlement method, and the like, belong to different application scenarios, and need to use different flow templates.

In this embodiment, the flow nodes in the flow template include at least one of the following:

an object supply node, the object supply node being related to an operation of supplying a target object by the object provider; for example, in the application scenario of the "network transaction", the "object supply node" is a delivery node and is used for controlling delivery behaviors of the seller;

a data supply node, the data supply node being related to an operation of supplying interaction data corresponding to the target object by the data provider; for example, in the application scenario of the "network transaction", the "data supply node" is a payment node and is used for controlling payment behaviors of the buyer; and a data interaction node, the data interaction node being related to an interactive operation of transmitting the interaction data to the object provider; for example, in the application scenario of the "network transaction", the "data interaction node" is a settlement node and is used for controlling a process of transmitting an amount paid by the buyer to the seller.

Step 104: Select, according to a selection instruction sent by the object provider, a flow template for a target object corresponding to the object creation request.

Step 106: Implement, when an interaction request for the target object is received from a data provider, an interactive operation between the object provider and the data provider according to the selected flow template.

It can be learned from the foregoing technical solution that, in this application, a service flow can be customized flexibly by configuring a flow template, without being bound to a fixed flow model. This helps reduce costs and complexity of changing a service flow and improve versatility of the service flow.

1. Flow Template Generation

Figure 2:
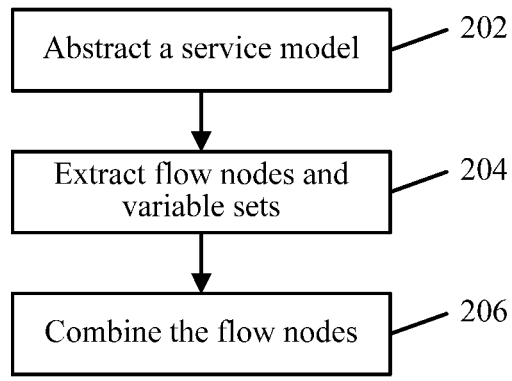
FIG. 2 is a flowchart of generating a flow template according to an exemplary embodiment of this application.

FIG. 2 is a flowchart of generating a flow template according to an exemplary embodiment of this application. As shown in FIG. 2, the flow can be implemented by a server and may include the following steps:

Step 202: Abstract a service model.

In this embodiment, each service should be implemented by complying with a corresponding service model, and an interactive platform also has a corresponding service model. Therefore, a complex service model may be extracted as an abstract simplified service node by abstracting the service model, thereby separating the interactive nature of the service model. The service model of the interactive platform may be abstracted and simplified as an "object supply node", a "data supply node", and a "data interaction node".

Step 204: Extract flow nodes and variable sets.

In this embodiment, the "object supply node" is related to a supply operation performed by an object provider on a target object, the "data supply node" is related to a supply operation performed by a data provider on interaction data corresponding to the target object, and the "data interaction node" is related to an interactive operation of transmitting the interaction data to the object provider.

For example, in an application scenario of a "network transaction", the "object supply node" is delivery node and is used for controlling delivery behaviors of a seller; the "data supply node" is a payment node and is used for controlling payment behaviors of a buyer; and the "data interaction node" is a settlement node and is used for controlling a process of transmitting an amount paid by the buyer to the seller.

TABLE 1

| Flow node | Node variable |
|---|---|
| Delivery node | Delivery batch (once, in batches) |
| | Quantity tolerance (quantity overflow, |
| | or quantity shortage) |
| | Express |
| | Transfer of title to goods |
| | Quantity of deliveries |
| | Delivery timeout |
| Payment node | Source of funds (own funds, financing, |
| | or marketing) |
| | Payment method (PAYG, delayed payment, |
| | or payment in advance) |
| | Payment ratio |
| | Payment timeout |
| Settlement node | Settlement time (T + 0, T + n) |
| | Settlement ratio |

For the application scenario of the "network transaction", Table 1 shows node variables that may exist in a node variable set corresponding to each flow node. For example, a node variable set corresponding to a "delivery node" may include node variables such as a "delivery batch", a "quantity tolerance", an "express", a "transfer of title to goods", and a "delivery timeout". Each node variable has multiple options and values. For example, the "delivery batch" may be once or multiple times, the "quantity tolerance" may be a quantity overflow (within an appropriate numerical range, a delivery quantity is slightly greater than an agreed quantity) or a quantity shortage (within an appropriate numerical range, a delivery quantity is slightly less than an agreed quantity).

Step 206: Combine the flow nodes to obtain a flow template.

In this embodiment, using the "network transaction" as an example, a delivery process, a payment process, and a settlement process in a network transaction process are combined and configured to obtain a corresponding network transaction flow by means of negotiation, thereby implementing highly flexible configuration of the transaction flow.

For example, FIG. 3 shows a flow template obtained after combining and configuring the flow nodes. A flow corresponding to the flow template is as follows: an object supply ratio (belonging to the "object supply node")→a data supply ratio (belonging to the "data supply node")→an object right transfer ratio (belonging to the "data supply node")→a data supply method and ratio (belonging to the "data supply node"), and settlement time points (belonging to the "data interaction node") respectively after and corresponding to the "data supply ratio" in the second step of the flow and the "data supply method and ratio" in the fourth step of the flow.

In this case, when the flow template shown in FIG. 3 is applied to the application scenario of the "network transaction", the seller may check the flow template on an interface shown in FIG. 4A (FIG. 4A shows only a part of the flow template in FIG. 3, to provide an example for description).

2. Flow Template Configuration

The server receives a configuration instruction for the selected flow template, the configuration instruction being determined by the object provider and the data provider by means of negotiation; and performs quantization configuration or option configuration on the node variables in the selected flow template according to the configuration instruction.

In other words, each flow node in the flow template has one or more node variables (selected from a node variable set corresponding to the flow node). For example, a "delivery" node shown in FIG. 4A includes two node variables: a "delivery ratio" and a "receipt confirmation timeout". The object provider and the data provider (the seller and the buyer) can negotiate for the node variables and then configure the node variables, that is, configure the flow template.

As shown in FIG. 4A, specific values may be filled or multiple options may be provided for each node variable. In this case, configuration of a corresponding node variable can be completed provided that a value is filled (that is, quantization configuration is performed) or an option is selected (that is, option configuration is performed) based on a negotiation result between the object provider and the data provider. For example, the "delivery ratio" is configured to be 20%, the "receipt confirmation timeout" is configured to be seven whole days, and a "multiple" option is selected for a "settlement method", to obtain a configuration result shown in FIG. 4B. The object provider or the data provider generates the configuration result as a corresponding configuration instruction and then sends the configuration instruction to the server. The server completes configuration of the flow template, so as to generate a service flow required by the object provider and the data provider.

In some embodiments, the object provider and the data provider may modify content in the flow template, such as a preset order in which multiple flow nodes in the flow template are arranged, for example, compared with FIG. 4A, in a flow template shown in FIG. 4C, a "delivery" node and a "payment" node may be interchanged in their order; a flow node included in the selected flow template, for example, a flow node may be deleted or added; or a node variable corresponding to each flow node, for example, compared with FIG. 4A, in the low template shown in FIG. 4C, a node variable "allowing tolerance before delivery" is added at the "delivery" node.

In some embodiments, the server may not provide all flow templates that exactly satisfy actual requirements of the object provider and the data provider. The object provider and the data provider may modify and configure the flow template provided by the server. In addition, the server may further extract and store the modified flow template, so as to be subsequently used by the same object provider or data provider, or be shared with another object provider or data provider.

Figure 5:
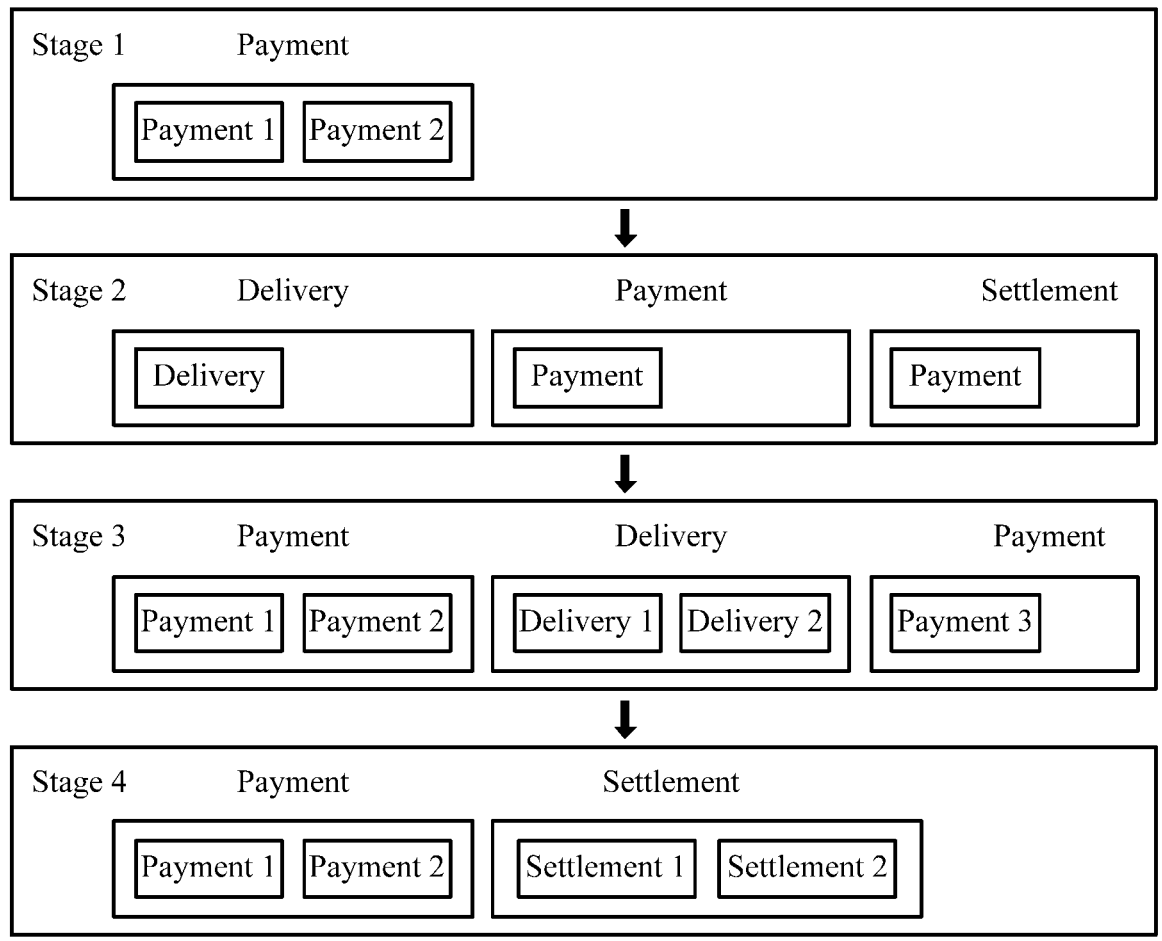
FIG. 5 is a schematic diagram of a flow template including multiple stages according to an exemplary embodiment of this application.

In some embodiments, the service flow may include only one stage, or when a service is relatively complex, as shown in FIG. 5, the service flow may include multiple stages. The object provider and the data provider may perform operations such as editing and configuration for each stage. The multiple stages are performed sequentially in a preset order. Subflows of the stages are relatively independent. For example, a subflow of a stage that has been configured may be performed first, with no need to wait for configuration of another subsequent stage. For example, when a subflow of a stage 2 is being performed, the server does not need to consider whether configuration of a stage 3 or a stage 4 has been completed.

In some embodiments, the object provider and the data provider may further additionally negotiate for their rights and obligations, for example, an assurance service that can be provided by the object provider (for example, "delivery within 24 hours" in a "network transaction"), a follow-up service after interaction (for example, an after-sales service in the "network transaction"), or industry conventions (for example, "free shipping" in the "network transaction").

In addition, the server may maintain the flow template in a "formula" manner. Using the "network transaction" as an example, it is assumed that "A" represents "payment" (that is, the "data supply node"), "B" represents "delivery" (that is, the "object supply node"), and "T" represents "settlement" (that is, the "data interaction node"). Based on a predefined semantic analysis rule such as "payment may exist alone", "settlement should not exist alone", or "delivery should be accompanied with payment", a subflow form that may exist in each state may be obtained: A (only including a payment node), AB (the payment node→a delivery node), BA (the delivery node→the payment node), AT (the payment node→a settlement node), ABT (the payment node→the delivery node→the settlement node), BAT (the delivery node→the payment node→the settlement node), and the like. A single stage may be used as a complete service flow, and multiple stages may be combined to obtain a more complex service flow.

Figure 6:
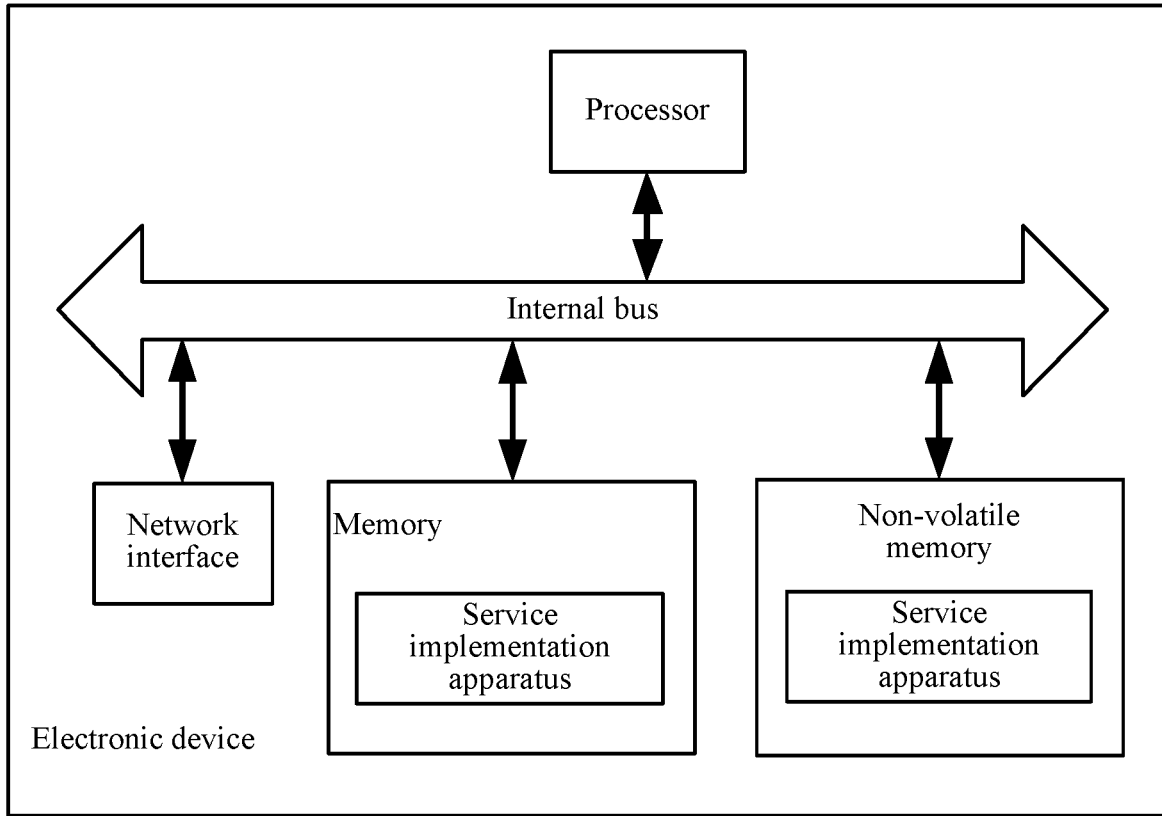
FIG. 6 is a schematic structural diagram of an electronic device according to an exemplary embodiment of this application.

FIG. 6 is a schematic structural diagram of an electronic device according to an exemplary embodiment of this application. Referring to FIG. 6, at a hardware level, the electronic device includes a processor, an internal bus, a network interface, a memory, and a non-volatile memory, and certainly may further include hardware required by other services. The processor reads a corresponding computer program from the non-volatile memory into the memory and runs the computer program, to form a service implementation apparatus at a logical level. Certainly, in addition to a software implementation, this application does not exclude another implementation such as a logical component or a combination of software and hardware. That is, an execution body of the following processing flow is not limited to each logical unit, or may be hardware or a logical component.

Figure 7:
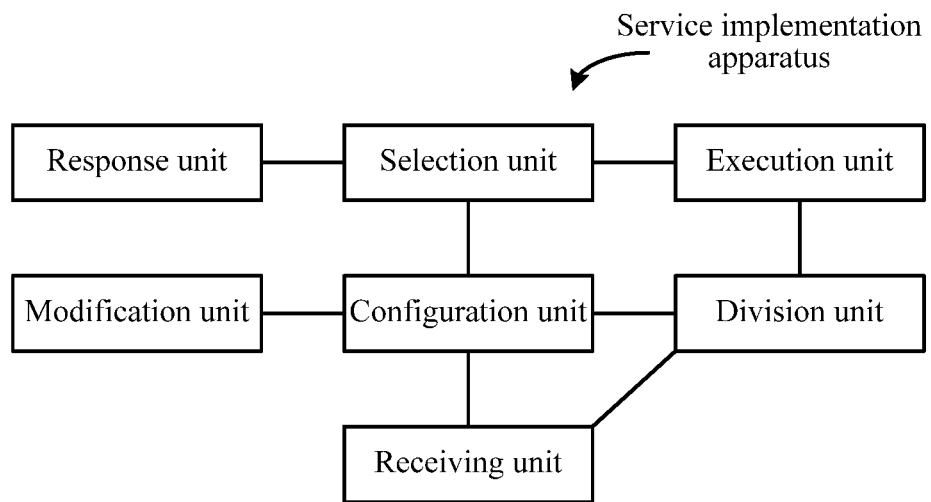
FIG. 7 is a block diagram of a service implementation apparatus according to an exemplary embodiment of this application.

Referring to FIG. 7, in the software implementation, the service implementation apparatus may include a response unit, a selection unit, and an execution unit.

The response unit returns, when an object creation request from an object provider is received, a response message to the object provider according to an application scenario corresponding to the object creation request, the response message including at least one flow template matching the application scenario.

The selection unit selects, according to a selection instruction sent by the object provider, a flow template for a target object corresponding to the object creation request.

The execution unit implements, when an interaction request for the target object is received from a data provider, an interactive operation between the object provider and the data provider according to the selected flow template.

Optionally, the flow template includes node variables respectively corresponding to multiple flow nodes that are arranged in a preset order, and the node variable is selected from a node variable set corresponding to the corresponding flow node according to a preset rule.

Optionally, the flow nodes include at least one of the following:

an object supply node, the object supply node being related to an operation of supplying the target object by the object provider;

a data supply node, the data supply node being related to an operation of supplying interaction data corresponding to the target object by the data provider; and a data interaction node, the data interaction node being related to an interactive operation of transmitting the interaction data to the object provider.

Optionally, the service implementation apparatus further includes:

a receiving unit, for receiving a configuration instruction for the selected flow template, the configuration instruction being determined by the object provider and the data provider by means of negotiation; and a configuration unit, for performing quantization configuration or option configuration on the node variables in the selected flow template according to the configuration instruction.

Optionally, the service implementation apparatus further includes:

a modification unit, for modifying, according to the configuration instruction, at least one of the following information of the selected flow template: the preset order, a flow node included in the selected flow template, or the node variable corresponding to each flow node.

Optionally, the service implementation apparatus further includes:

a division unit, for dividing, according to the configuration instruction, the selected flow template into subflows of multiple stages, so that the interactive operation between the object provider and the data provider is implemented by sequentially performing the subflows of the multiple stages.

Optionally, the target object is a transaction commodity, the interaction data is a transaction amount, and the flow template is an execution template of a transaction flow.

In a typical configuration, a computing device includes one or more processors (CPU), an input/output interface, a network interface, and a memory.

The memory may include a volatile memory, a random access memory (RAM), and/or a nonvolatile memory in a computer-readable medium, for example, a read-only memory (ROM) or a flash memory (flash RAM). The memory is an example of the computer-readable medium.

The computer-readable medium includes nonvolatile, volatile, removable, and non-removable media, and may implement information storage by using any method or technology. The information may be computer-readable instructions, data structures, program modules, or other data. The processor may execute the instructions, data structures, and/or program modules to perform the methods as described above. For example, the units or modules described above and shown in the drawings, e.g., FIG. 7, can be program units stored in the memory. When the processor executes the program units, it causes the server to perform the corresponding steps as described above and shown in the figures. Examples of a computer storage medium include but are not limited to: a phase-change memory (PRAM), a static random access memory (SRAM), a dynamic random access memory (DRAM), a random access memory (RAM) of another type, a read-only memory (ROM), an electrically erasable programmable read-only memory (EEPROM), a flash memory or other types of memories, a compact disc read-only memory (CD-ROM), a digital versatile disc (DVD), another optical memory, a tape cassette, a disk memory, another magnetic storage device, or any other non-transitory medium. The computer storage medium may be configured to store information that can be accessed by the computing device. As defined in this specification, the computer-readable medium does not include a transitory medium, for example, a modulated digital signal or a carrier.

It should be further noted that the terms "include", "comprise", and any variants thereof are intended to cover a non-exclusive inclusion. Therefore, a process, method, article, or device that includes a series of elements not only includes such elements, but also includes other elements not specified expressly, or may include inherent elements of the process, method, article, or device. Unless otherwise specified, an element limited by "include a/an . . . " does not exclude other same elements existing in the process, the method, the article, or the device that includes the element.

The foregoing descriptions are merely preferred embodiments of this application, but are not intended to limit this application. Any modification, equivalent replacement, or improvement made without departing from the spirit and principle of this application should fall within the protection scope of this application.

What is claimed is:

1. A service implementation method, comprising:
returning, when an object creation request from an object provider is received, a response message to the object provider according to an application scenario corresponding to the object creation request, the response message comprising at least one flow template matching the application scenario;
selecting, according to a selection instruction sent by the object provider, a flow template for a target object corresponding to the object creation request; and
implementing, when an interaction request for the target object is received from a data provider, an interactive operation between the object provider and the data provider according to the selected flow template.

2. The method according to claim 1, wherein the flow template comprises node variables respectively corresponding to multiple flow nodes that are arranged in a preset order, and each of the node variables is selected from a node variable set corresponding to the corresponding flow node according to a preset rule.

3. The method according to claim 2, wherein the flow nodes comprise at least one of the following:
- an object supply node, the object supply node being related to an operation of supplying the target object by the object provider;
- a data supply node, the data supply node being related to an operation of supplying interaction data corresponding to the target object by the data provider; and
- a data interaction node, the data interaction node being related to an interactive operation of transmitting the interaction data to the object provider.

4. The method according to claim 2, further comprising:
- receiving a configuration instruction for the selected flow template, the configuration instruction being determined by the object provider and the data provider by means of negotiation; and
- performing quantization configuration or option configuration on the node variables in the selected flow template according to the configuration instruction.

5. The method according to claim 4, further comprising:
- modifying, according to the configuration instruction, at least one of the following information of the selected flow template: the preset order, a flow node comprised in the selected flow template, or the node variable corresponding to each flow node.

6. The method according to claim 4, further comprising:
- dividing, according to the configuration instruction, the selected flow template into subflows of multiple stages, so that the interactive operation between the object provider and the data provider is implemented by sequentially performing the subflows of the multiple stages.

7. The method according to claim 1, wherein the target object is a transaction commodity, the interaction data is a transaction amount, and the flow template is an execution template of a transaction flow.

8. A service implementation apparatus, comprising:
- a response unit, for returning, when an object creation request from an object provider is received, a response message to the object provider according to an application scenario corresponding to the object creation request, the response message comprising at least one flow template matching the application scenario;
- a selection unit, for selecting, according to a selection instruction sent by the object provider, a flow template for a target object corresponding to the object creation request; and
- an execution unit, for implementing, when an interaction request for the target object is received from a data provider, an interactive operation between the object provider and the data provider according to the selected flow template.

9. The apparatus according to claim 8, wherein the flow template comprises node variables respectively corresponding to multiple flow nodes that are arranged in a preset order, and each of the node variables is selected from a node variable set corresponding to the corresponding flow node according to a preset rule.

10. The apparatus according to claim 9, wherein the flow nodes comprise at least one of the following:
- an object supply node, the object supply node being related to an operation of supplying the target object by the object provider;
- a data supply node, the data supply node being related to an operation of supplying interaction data corresponding to the target object by the data provider; and
- a data interaction node, the data interaction node being related to an interactive operation of transmitting the interaction data to the object provider.

11. The apparatus according to claim 9, further comprising:
- a receiving unit, for receiving a configuration instruction for the selected flow template, the configuration instruction being determined by the object provider and the data provider by means of negotiation; and
- a configuration unit, for performing quantization configuration or option configuration on the node variables in the selected flow template according to the configuration instruction.

12. The apparatus according to claim 11, further comprising:
- a modification unit, for modifying, according to the configuration instruction, at least one of the following information of the selected flow template: the preset order, a flow node comprised in the selected flow template, or the node variable corresponding to each flow node.

13. The apparatus according to claim 11, further comprising:
- a division unit, dividing, according to the configuration instruction, the selected flow template into subflows of multiple stages, so that the interactive operation between the object provider and the data provider is implemented by sequentially performing the subflows of the multiple stages.

14. The apparatus according to claim 8, wherein the target object is a transaction commodity, the interaction data is a transaction amount, and the flow template is an execution template of a transaction flow.

15. A service implementation apparatus, comprising a processor and a non-transitory computer-readable memory storing instructions that, when executed by the processor, cause the apparatus to perform a method, the method comprising:
- returning, when an object creation request from an object provider is received, a response message to the object provider according to an application scenario corresponding to the object creation request, the response message comprising at least one flow template matching the application scenario;
- selecting, according to a selection instruction sent by the object provider, a flow template for a target object corresponding to the object creation request; and
- implementing, when an interaction request for the target object is received from a data provider, an interactive operation between the object provider and the data provider according to the selected flow template.

16. The service implementation apparatus according to claim 15, wherein the flow template comprises node variables respectively corresponding to multiple flow nodes that are arranged in a preset order, and each of the node variables is selected from a node variable set corresponding to the corresponding flow node according to a preset rule.

17. The service implementation apparatus according to claim 16, wherein the flow nodes comprise at least one of the following:
- an object supply node, the object supply node being related to an operation of supplying the target object by the object provider;
- a data supply node, the data supply node being related to an operation of supplying interaction data corresponding to the target object by the data provider; and a data interaction node, the data interaction node being related to an interactive operation of transmitting the interaction data to the object provider.

18. The service implementation apparatus according to claim 16, wherein the method further comprises:

receiving a configuration instruction for the selected flow template, the configuration instruction being determined by the object provider and the data provider by means of negotiation; and performing quantization configuration or option configuration on the node variables in the selected flow template according to the configuration instruction.

19. The service implementation apparatus according to claim 18, wherein the method further comprises:

modifying, according to the configuration instruction, at least one of the following information of the selected flow template: the preset order, a flow node comprised in the selected flow template, or the node variable corresponding to each flow node.

20. The service implementation apparatus according to claim 18, wherein the method further comprises:

dividing, according to the configuration instruction, the selected flow template into subflows of multiple stages, so that the interactive operation between the object provider and the data provider is implemented by sequentially performing the subflows of the multiple stages.

* * * * *